United States Patent Office 2,769,833
Patented Nov. 6, 1956

2,769,833

PRODUCTION OF PHENOXY ACID ESTERS THROUGH THE POTASSIUM PHENOLATE

Ira Weil, New York, N. Y., assignor to Diamond Alkali Company, Cleveland, Ohio, a corporation of Delaware No Drawing. Application November 2, 1953, Serial No. 389,893

10 Claims. (Cl. 260—473)

This invention relates to the production of chemical compounds of the class of esters. More particularly, the invention is concerned with the manufacture of phenoxy acid esters, and is especially concerned with the production of chlorinated phenoxy organic acid esters such as are now known to be especially useful in controlling the growth of plant life. Thus, the invention is concerned with the manufacture of materials such as 2,4-dichlorophenoxyacetic acid esters, sometimes designated herein as 2,4-D esters.

In the literature, helpful disclosures concerning the production of phenoxy acid esters are relatively scarce; little has been done to improve the original early teachings that were hastily assimilated by industry for the purposes of immediate production. However, it may be said that two basic approaches to synthesis of such compounds are recognized, both of which operate reasonably acceptably. Esters, such as 2,4-D esters, have been prepared by the straight esterification of the 2,4-D acid with a suitable alcohol. This reaction is described in U. S. Patent No. 2,493,126. Similar methods are disclosed in U. S. Patents Nos. 2,523,187 and 2,523,188, wherein the alcohol employed is an ether alcohol.

A further method of producing esters of phenoxy acid esters involves the condensation of chlorinated esters with sodium phenolate. For example, it is known that ethyl bromo-acetate may be condensed with sodium phenolate, or a substituted sodium phenolate, to give the ethyl ester of phenoxy or a substituted phenoxy acetic acid.

These reactions proceed in what may be regarded as an orderly fashion, but they are accompanied by important disadvantages with which, in part, the present invention is concerned. In particular, it is desirable that the time in which the materials of the invention are produced be as short as reasonably possible and this invention has as one of its objectives the provision of a process of small time requirements.

The present invention provides a new process by which it is possible to form the esters within a time span which is surprisingly short and is singularly free of difficult manipulative operations as requirements for the process. Additionally, the process of the invention affords an unusually efficient reaction in that the products of side reactions constitute a very small portion of the reaction mass.

In general, the process of this invention involves the production of esters by first forming potassium phenolate, which is thereafter condensed with a substituted organic acid ester. The production of potassium phenolate takes place either in an excess of an azeotroping agent or in a combined solvent of an azeotroping agent and absolute alcohol. Solid anhydrous potassium hydroxide is utilized to form the potassium salt. During the reaction of forming the potassium salt, water is continuously removed so that the phenolate product is available for the subsequent condensation reaction as an almost completely dry substance.

The phenolate product of the first step of the process is supplied to the subsequent condensation reaction either in solution in the azeotroping agent or in the combined solvent, the reaction with the substituted organic acid ester proceeding forthwith to the formation of the desired phenoxy acid ester, accompanied by the formation of small quantities of side reaction products and, of course, the potassium salt component of the reaction.

Various phenoxy acid esters may be produced by the process herein disclosed. Regarding the phenolic constituent of the phenolate forming reaction, various substituents may be present in the aromatic ring and in any position thereon so long as the phenol is soluble under the conditions of the reaction and so long as the phenolate is formed on contact with potassium hydroxide. Thus, for example, alkyl chains, whether alike or not, may be substituted in one, two or more ring positions without destroying the reactivity of the phenol. Similarly, the ring may contain alkoxy groups, such as methoxy, ethoxy and the like. However, the invention is more particularly concerned with the production of halogenated phenoxy acid esters and contemplates that one or more halogen substituents may be present in the ring. The substituents may be in the 2, 3 positions, the 2, 4 positions, the 3, 5 positions, or other arrangements on the ring; all of the monohalogen derivatives are suitable for this purpose. The invention is especially concerned with the production of 2,4-dichlorophenoxy acid esters and the example hereinafter set forth is directed to this specific embodiment.

The formation of the phenolate may take place in any suitable alcohol, such as ethyl, propyl, n-butyl, amyl and isomers thereof. Similarly, the lower molecular weight polyhydric alcohols may be employed. However, the solvent is optional and may be dispensed with in that an excess of azeotroping agent may replace the solvent and the reatcion with necessary water removal may be accomplished without interference from a solvent. Water is removed in Example I by means of a water-benzene-solvent (isopropyl alcohol) azeotrope, the benzene being added in the early stages of the reaction. This system, however, is not critical, as in Example II the azeotrope comprises water and toluene. Other variations are permissible provided that a suitable azeotrope is formed which will permit water removal under the conditions of reaction and without undue prolongation of the reaction time. Accordingly, other azeotrope formers than benzene and toluene may be employed in the process described herein, such as, for example, ethyl benzene, cyclohexane, cyclohexene, metaxylene, mesitylene, pentane, hexane, heptane, octane, and decane. Also, materials such as 1,2-dichloropropane and 1,2-dichloroethane are suitable. Various other suitable mixtures as found in the literature may be employed, for example, Handbook of Chemistry, Lange, Fifth Edition, dated 1944, page 1395. Furthermore, it is possible to remove water by other known expedients as, for example, by employing a suitable dehydrating agent.

The esters that may be prepared in accordance with this invention constitute a large group. As was previously indicated, they are formed by a condensation reaction wherein a substituted ester is condensed with a potassium phenolate. Accordingly, it will be understood that the character of the substituted ester which is condensed with the phenolate determines the character of the phenoxy acid ester.

For convenience, the full chemical name of the substituted ester which is condensed with the phenolate is not hereafter given in all instances. Instead, in the paragraph immediately following, a group of alcoholic materials are set forth which, with a substituted acid, are suitable for forming an ester which may thereafter be condensed with the phenolate to provide the ultimate reaction product.

The alcoholic constituent of the substituted ester may be selected from a large field. It is contemplated that any of the lower molecular weight alcohols may be employed, such as, for example, mono- and polyhydric alcohols having from 1 to about 9 carbon atoms. Examples of these are propyl, butyl, and amyl alcohol, ethylene and diethylene glycol, propylene and dipropylene glycol and their isomers and cyclic derivatives. Also, various sugar alcohols may be employed. Monoethers of ethylene and diethylene glycol may also be employed, such as ethylene and diethylene glycol monomethyl ether, ethylene and diethylene glycol monoethyl ether, ethylene and diethylene glycol monopropyl ether, ethylene and diethylene glycol monobutyl ether and diethylene glycol monophenyl ether. Similarly, various monoethers of propylene and dipropylene glycol may be employed, such as the monomethyl, ethyl, propyl, and butyl ethers. Generally, it may be said that if the substituted ester is not rendered insoluble under the conditions of the reaction by the esterifying alcohol, the alcohol is suitable.

Returning now for further discussion of the formation of the intermediate, potassium phenolate, and the character of the medium in which it is supplied to the condensation step in the process, it should be observed that the potassium salt is specified particularly and to the exclusion of other salt-forming metals. The significance of this feature of the invention is now to be discussed more fully. As has been indicated previously herein, it is quite desirable that the phenolate be supplied to the condensation step in as dry condition as is possible within the limits of practicality. With this as an object, the problem arises of effecting reaction of a metal-containing substance with the phenol without employing a water solution. The problem might be thought to suggest a non-aqueous medium. However, it is to be noted that if sodium hydroxide is employed, as would be highly desirable, it must be as a water solution; the addition of sodium hydroxide to a phenol especially in an alcoholic medium does not result in salt formation at a practical rate of reaction. Additionally, and aside from the problem just mentioned, in any case, the formation of the phenolate results in the production of a corresponding amount of water in the reaction. As the removal of water is quite important to satisfactory completion of the phenolate, and as the subsequent condensation reaction proceeds most desirably as contemplated by this invention only in a substantially anhydrous medium, it is apparent that sodium hydroxide cannot be employed without the concurrent introduction of a serious water removal problem.

While anhydrous sodium hydroxide is practically insoluble both in the azeotroping agents of this invention and in the alcohol and, therefore, cannot be employed as a dry mass, quite surprisngly, it is found that solid anhydrous potassium hydroxide may be employed in the formation of the phenolate with astonishing success. Apparently potassium hydroxide is just sufficiently more soluble both in the azeotroping agents hereof and in the alcohol than is sodium hydroxide that the reaction to phenolate formation proceeds readily. In addition to the apparently greater solubility of dry potassium hydroxide, it appears that as the first phenolate is formed, water of that reaction may have an accelerative effect upon the solubility of potassium hydroxide for the reaction is observed to pick up in speed as a small amount of water builds up in the system.

Although it has been indicated that water is removed as it is formed in the reaction, it will be understood that absolute dryness is not achieved within the practical limits of the process, and that consequently, a small amount of water is at all times present in the system. The invention contemplates preferably a maximum water content of about 0.3% of the reaction mixture; accordingly, the water removal technique is calculated to dispose of water in excess of about this quantity. Water removal does not have to begin immediately with the starting of the reaction but may be begun thereafter sufficiently early to bring about the completion of the reaction within a desired time limit which one establishes for phenolate formation. It will be understood from the foregoing that the phenolate medium will contain up to about 0.3% water by weight of the reaction mixture at the time it is supplied to the condensation reaction. It is found that the condensation reaction proceeds to yields of about 85% to 90% of the desired ester under the specified substantially dry conditions. The presence of increased amounts of water leads to the formation of numerous undesirable side products with consequent reduction in yields to about 50% of the desired ester and below.

Aside from the striking advantage which the use of potassium hydroxide affords in respect to the problem of the presence of water, an even more surprising phenomenon is observed in the use of potassium phenolate in the subsequent condensation reaction. It is found that if, for example, sodium phenolate is supplied to the condensation reaction under conditions identical with those under which the potassium phenolate is supplied, the reaction requires approximately four hours for completion to the formation of the desired ester. When potassium phenolate is employed, the reaction proceeds at once, without added catalytic aid, to completion in less than one hour. This obviously is a most significant accomplishment in the production of the esters of this invention whether in alcohol solution or not; the reduction in the time of formation of chemical substances is one of the most pressing and importan problems that the industry encounters.

The observed phenomenon of increased reaction rate is substantially without explanation; it is not considered that there is any reported characteristic of organic potassium compounds which would lead one to suppose that the results achieved by this invention would be forthcoming. Indeed, even inorganic data as to potassium and sodium compounds suggest nothing more than a relatively slight difference in chemical activity.

In order that those persons skilled in the art may practice this invention and in its most desired aspects, a detailed description of exemplary processes is provided hereinafter.

*Example 1*

Into a suitable reactor are placed 196 grams (1.2 moles of 2,4-dichlorophenol and 50 cc. of isopropyl alcohol. To this solution are slowly added 61.7 grams (1.1 moles) of solid potassium hydroxide with agitation. The mixing is accompanied by large evolution of heat. However, the temperature drops rather rapidly and cooling is not considered essential. The reaction proceeds without difficulty, potassium phenolate crystallizing as the product. When the temperature has dropped to about 70° C., 75 cc. of benzene are added and sufficient heat is supplied to effect distillation of the resulting water-benzene-isopropyl alcohol azeotrope. About 20 cc. of water could be expected to be formed as is apparent from the relative quantities of the reactants, and when this approximate quantity has been collected, formation of the phenolate may be regarded as complete. At this point, heating is stopped and the addition of isopropyl chloroacetate is begun. The addition of this material takes place slowly, preferably sufficiently slowly so that refluxing continues. Isopropyl chloroacetate is added in a quantity of 137 grams (1 mole), and when the addition is complete, the mixture is heated for about one hour, during which time the temperature of the reaction mixture rises to about 120° C. and benzene and isopropyl alcohol are distilled off.

The resulting slurry from the above reaction is allowed to cool and is then transferred to a wash tank and washed twice at about 40° C. with a dilute sodium or potassium hydroxide solution, such as 0.1 N solution, and twice with water, using volumes equal to the reaction mixture in each wash. The wash solutions contain salts of 2,4- dichlorophenoxy acetic acid, dichlorophenol, potassium chloride, a small quantity of isopropyl alcohol, traces of benzene and also traces of the principal reaction product, the isopropyl ester of 2,4-dichlorophenoxy acetic acid. The wash solutions are then delivered to an acidification tank. The reaction product, that is the ester, is placed in a vacuum drier where residual water and benzene are removed. The ester product requires no further treatment. However, the wash solutions are sufficiently valuable to warrant recovery treatment.

In proceeding in accordance with the foregoing example, if the potassium phenolate does not crystallize promptly, the mixture should preferably be seeded so as to cause it to do so because it is found that water may thereby be removed more efficiently.

*Example II*

This example illustrates a semiplant run avoiding the use, in the initial step of forming the potassium salt, of the alcohol solvent.

2750 pounds of dichlorophenol and 215 gallons of toluene are combined in a suitable reactor. 1030 pounds of potassium hydroxide are slowly added with agitation. The temperature inherently rises to 95° C. and water distillation begins. When the vapor temperature of the azeotrope reaches 109°–110° C., the potassium phenolate precipitates and 2100 pounds of isopropyl chloroacetate are added at a sufficiently rapid rate to insure continuance of refluxing. Upon the completion of the addition of the chloroacetate, heat is applied to the mass and the toluene distilled off. After one hour, the reaction is complete, and after cooling to 80°–90° C., the isopropyl ester is washed several times with water, dilute sulfuric acid and final dilute sodium carbonate solution, following which drying is under vacuum. The yield of ester is 95% of theory.

By similar procedure, the secondary butyl and other esters are formed.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the production of phenoxy acid esters which comprises reacting a phenol with substantially anhydrous potassium hydroxide thereby producing potassium phenolate, removing the water product of reaction, condensing with said phenolate under substantially anhydrous conditions, an ester having a functional group reactive with the potassium of the said phenolate, said group being attached to a carbon atom of the acid portion of said ester, and recovering the phenoxy acid ester so formed as the product of the reaction.

2. A process as claimed in claim 1 wherein the potassium phenolate is produced in substantially absolute alcohol solution.

3. A process as claimed in claim 1 wherein the said water removal takes place concurrently as the said potassium phenolate is formed, and wherein the said water is removed by azeotropic distillation.

4. A process as claimed in claim 1 wherein the said phenol is a chlorinated phenol.

5. A process as claimed in claim 1 wherein said phenol is 2,4-dichlorophenol.

6. A process for the production of phenoxy acid esters which comprises reacting a cholorinated phenol with substantially anhydrous potassium hydroxide thereby producing potassium phenolate, removing the water product of the reaction by azeotropic distillation, condensing with said phenolate under substantially anhydrous conditions a low molecular weight ester of monochloroacetic acid, said ester containing between about 1 and 9 carbon atoms, and recovering the phenoxy acid ester so formed as a product of the reaction.

7. A process as claimed in claim 6 wherein the ester is the isopropyl ester of monochloracetic acid.

8. The process as claimed in claim 6 wherein the phenol is 2,4-dichlorophenol.

9. The process as claimed in claim 6 wherein benzene is added as the azeotrope former to effect water removal.

10. A process for the production of 2,4-dichlorophenoxy acetic acid esters which comprises reacting 2,4-dichlorophenol with solid, substantially anhydrous, potassium hydroxide in absolute alcohol to form potassium phenolate, adding an azeotrope agent to said reaction mixture, and removing by azeotropic distillation the reaction water concurrently as the reaction proceeds, adding to said reaction mass a monochloroacetic acid ester of an alcohol having from about 1 to about 9 carbon atoms in a quantity sufficient to afford an approximate mol per mol ratio of said ester to said potassium phenolate and condensing said substances under substantially anhydrous conditions, removing from the last said reaction mass undesired components thereof and recovering 2,4-dichlorophenoxy acetic acid ester therefrom.

References Cited in the file of this patent

UNITED STATES PATENTS

| 2,010,727 | Kirstahler et al. | Aug. 6, 1935 |

FOREIGN PATENTS

| 102,315 | Germany | Mar. 9, 1899 |
| 108,342 | Germany | Dec. 19, 1899 |